(12) United States Patent
Fecant

(10) Patent No.: US 9,504,990 B2
(45) Date of Patent: Nov. 29, 2016

(54) THIORESISTANT CATALYST, MANUFACTURING PROCESS AND USE IN SELECTIVE HYDROGENATION

(75) Inventor: Antoine Fecant, Brignais (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 516 days.

(21) Appl. No.: 13/982,538

(22) PCT Filed: Jan. 10, 2012

(86) PCT No.: PCT/FR2012/000017
§ 371 (c)(1),
(2), (4) Date: Sep. 3, 2013

(87) PCT Pub. No.: WO2012/104498
PCT Pub. Date: Aug. 9, 2012

(65) Prior Publication Data
US 2013/0338413 A1    Dec. 19, 2013

(30) Foreign Application Priority Data

Jan. 31, 2011  (FR) ..................................... 11 00288

(51) Int. Cl.
| | | |
|---|---|---|
| *C07C 5/02* | (2006.01) |
| *C07C 5/03* | (2006.01) |
| *C07C 5/10* | (2006.01) |
| *B01J 21/00* | (2006.01) |
| *B01J 21/04* | (2006.01) |
| *B01J 29/00* | (2006.01) |
| *B01J 23/00* | (2006.01) |
| *B01J 23/02* | (2006.01) |
| *B01J 23/08* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 23/60* | (2006.01) |
| *B01J 23/72* | (2006.01) |
| *B01J 23/89* | (2006.01) |
| *B01J 35/10* | (2006.01) |
| *B01J 37/18* | (2006.01) |
| *C10G 45/40* | (2006.01) |
| *C10G 45/52* | (2006.01) |
| *B01J 23/48* | (2006.01) |

(52) U.S. Cl.
CPC ............ *B01J 23/8926* (2013.01); *B01J 23/60* (2013.01); *B01J 35/1019* (2013.01); *B01J 35/1042* (2013.01); *B01J 37/18* (2013.01); *C10G 45/40* (2013.01); *C10G 45/52* (2013.01); *B01J 21/04* (2013.01); *B01J 23/48* (2013.01); *C10G 2300/1096* (2013.01)

(58) Field of Classification Search
CPC .......... B01J 21/04; B01J 21/06; B01J 21/08; B01J 21/10; B01J 21/12; B01J 21/14; B01J 21/16; B01J 23/06; B01J 23/42; B01J 23/44; B01J 23/54; B01J 23/60; B01J 23/8926; B01J 23/8946; B01J 23/8953; B01J 37/0236; B01J 37/04; B01J 37/08; B01J 37/16; C07C 5/03; C07C 5/10
USPC ................. 502/74, 262, 263, 327, 328, 329, 502/331–334, 339, 349–351, 355, 439; 585/269, 277
See application file for complete search history.

(56) References Cited

U.S. PATENT DOCUMENTS

| | | | |
|---|---|---|---|
| 3,218,268 A | | 11/1965 | Arnold |
| 3,751,508 A | | 8/1973 | Fujiso et al. |
| 4,190,557 A | * | 2/1980 | Antos .................. B01J 23/6567 502/226 |
| 4,210,561 A | * | 7/1980 | Antos .................... B01J 23/462 502/226 |
| 4,231,897 A | * | 11/1980 | Antos .................... C10G 35/09 502/226 |
| 4,280,930 A | * | 7/1981 | Antos .................. B01J 23/8953 502/326 |
| 4,312,791 A | * | 1/1982 | Antos .................. B01J 23/8953 502/326 |

(Continued)

FOREIGN PATENT DOCUMENTS

| | | |
|---|---|---|
| EP | 1754535 A1 | 2/2007 |
| EP | 1767270 A1 | 3/2007 |

(Continued)

OTHER PUBLICATIONS

International Search Report for PCT/FR2012/000017 (Oct. 29, 2012).

*Primary Examiner* — Cam N. Nguyen
(74) *Attorney, Agent, or Firm* — Millen White Zelano and Branigan, PC; Csaba Henter; Anthony Zelano

(57) ABSTRACT

The invention concerns a thioresistant catalyst which comprises an active phase deposited on a support, said active phase comprising at least one noble metal from group VIIIB and at least one metallic oxide from group IB or from group IIB, said support being selected from the group formed by refractory oxides, coal, clays, silica-alumina and/or their mixtures, and said support having a specific surface area in the range 110 to 300 m²/g. The invention also concerns the process for the preparation of said catalysts and their uses in the selective hydrogenation of hydrocarbons comprising acetylenic, dienic and/or alkenylaromatic functions. The invention is applicable to the refining field, and more particularly to the treatment of gasolines obtained by steam cracking (pyrolysis gasoline).

16 Claims, No Drawings

(56) References Cited

U.S. PATENT DOCUMENTS

| | | | |
|---|---|---|---|
| 5,045,521 A | 9/1991 | Lox et al. | |
| 5,413,984 A * | 5/1995 | Marecot | B01J 23/38 423/213.5 |
| 5,523,271 A * | 6/1996 | de Agudelo | B01J 21/18 502/74 |
| 5,801,114 A * | 9/1998 | Durand | B01D 53/9418 423/213.5 |
| 5,948,942 A * | 9/1999 | Ramirez de Agudelo | B01J 21/18 502/74 |
| 6,126,912 A * | 10/2000 | Bourges | B01D 53/8628 423/235 |
| 6,165,934 A * | 12/2000 | Gardner | B01D 53/9418 502/325 |
| 6,576,588 B2 | 6/2003 | Ryu et al. | |
| 6,717,022 B2 | 4/2004 | Ryu et al. | |
| 7,563,743 B2 * | 7/2009 | Euzen | B01J 23/888 208/113 |
| 7,919,659 B2 | 4/2011 | Fukuzawa | |
| 2002/0131925 A1 | 9/2002 | Shore et al. | |
| 2003/0036669 A1 | 2/2003 | Ryu et al. | |
| 2003/0171629 A1 | 9/2003 | Ryu et al. | |
| 2005/0245621 A1 | 11/2005 | Baijense et al. | |
| 2008/0064908 A1 | 3/2008 | Fukuzawa | |

FOREIGN PATENT DOCUMENTS

| | | |
|---|---|---|
| WO | 02/081416 A2 | 10/2002 |
| WO | 03/080238 A1 | 10/2003 |

* cited by examiner

THIORESISTANT CATALYST, MANUFACTURING PROCESS AND USE IN SELECTIVE HYDROGENATION

The invention relates to catalysts which are stable, selective and resistant to sulphur-containing impurities contained in pyrolysis gasolines. The invention also relates to the process for the preparation of said catalysts and to their uses in the selective hydrogenation of hydrocarbons comprising acetylenic, dienic and/or alkenylaromatic functions. The invention is applicable to the field of refining, and more particularly to the treatment of gasolines obtained by steam cracking (pyrolysis gasoline).

Because of their high aromatic hydrocarbons content, pyrolysis gasolines constitute a highly upgradeable product in the fuels field as well as in that of petrochemistry. However, such gasolines contain non-negligible quantities of acetylenic, dienic and alkenylaromatic compounds, which are the source of the formation of gums in engines or in petrochemicals plants. Acetylenic, diolefinic and alkenylaromatic compounds are highly reactive polyunsaturated compounds which polymerize very readily. Thus, it is vital to treat pyrolysis gasolines before using them as fuels or before upgrading them petrochemically. Selective hydrogenation is the principal treatment developed to specifically eliminate unwanted polyunsaturated compounds from such gasolines. It means that polyunsaturated compounds can be converted into the corresponding alkenes or aromatics by preventing them from being completely saturated and thus forming the corresponding straight chain and cyclic alkanes.

Selective hydrogenation catalysts are generally based on metals from group VIIIB of the periodic classification of the elements, preferably palladium or nickel. The active phase of the catalysts is in the form of small particles of metal deposited on a support. The support may be a refractory oxide in the form of beads, extrudates, trilobes or shapes with other geometries. The quantity of metal, the particle size of the metal and the distribution of the active phase in the support are criteria which are important having regard to the activity and selectivity of such catalysts.

The supported metal particles may have a mean dimension in the range 1 to 5 nm. This dimension is adapted to the demands of the selective hydrogenation reactions. In effect, the rate of the reaction for the hydrogenation of polyunsaturated molecules such as diolefins or acetylenes depends on the size of the metal particles. This result is generally described by the term "structural sensitivity". An optimum is generally observed for a size of the order of 3 to 4 nm; this value can vary as a function of the molecular mass of the reagents (M Boudart, W C Cheng, J Catal, 106, 1987, 134; S Hub, L Hilaire, R Touroude, Appl Catal, 36, 1992, 307).

The catalysts employed for selective hydrogenation undergo severe deactivation throughout their catalytic cycle. This is in part due to the formation of oligomers, but also to the presence of contaminants such as sulphur-containing compounds. Thus, during their cycle, the performances of the catalysts reduce substantially and steps for rejuvenation or regeneration are vital so that they can recover their activity and selectivity necessary to satisfy product specifications.

Selective hydrogenation catalysts have been developed that are resistant to sulphur-containing impurities. The document FR 2413127 discloses that adding a halogen to the active phase of a catalyst containing palladium can improve its catalytic properties when the feed contains sulphur-containing impurities. The document FR 2523149 describes a catalyst comprising palladium, gold in the metallic form and a reduced halogen content. That catalyst has good catalytic properties, even if the feed contains sulphur-containing impurities. However, such catalysts suffer from a number of disadvantages. On the one hand, the presence of halogens reduces the hydrogenating activity of such catalysts for feeds which contain very few sulphur-containing impurities. On the other hand, the presence of halogens creates acidity at the surface of the support for the catalyst, which promotes unwanted reactions of the polyunsaturated compound oligomerization type.

Thus, there is a continuing need for selective hydrogenation catalysts which are resistant to sulphur-containing impurities and which have good selectivity.

The aim of the invention is to overcome the disadvantages of the prior art by proposing a novel thioresistant hydrogenation catalyst with improved catalytic performances compared with prior art catalysts. The thioresistant catalyst of the invention comprises an active phase deposited on a support, said active phase comprising at least one noble metal from group VIIIB and at least 2% to 50% by weight of a metallic oxide from group IB or from group IIB with respect to the total catalyst weight, said support being selected from the group formed by refractory oxides, coal, clays, silica-alumina and/or their mixtures, and said support having a specific surface area in the range 110 to 300 m$^2$/g. The catalyst of the invention is selective.

The invention has the advantages of increasing the length of each cycle of the catalyst between rejuvenation or regeneration, and of thus increasing its service life. Unwanted reactions are also reduced.

In the remainder of the text, the groups of chemical elements given are those in the CAS classification (CRC Handbook of Chemistry and Physics, published by CRC Press, Editor in chief D R Lide, 81$^{st}$ edition, 2000-2001). As an example, group IIB in the CAS classification corresponds to metals in column 12 of the new IUPAC classification.

The quantity by weight of metallic oxide from group IB or IIB with respect to the total final supported catalyst mass is in the range 2% to 50% by weight, preferably in the range 2.1% to 45% by weight and more preferably in the range 2.5% to 30% by weight.

The metallic oxide from group IB or IIB is preferably selected from the group formed by copper oxide, zinc oxide and cadmium oxide. Preferably, the metallic oxide is selected from the group formed by copper oxide and zinc oxide. More preferably, the metallic oxide is zinc oxide. Still more preferably, the metallic oxide is copper oxide.

The quantity by weight of noble metal from group VIIIB with respect to the total final supported catalyst weight is in the range 0.01% to 2% by weight, preferably in the range 0.05% to 1% by weight.

Preferably, the noble metal from group VIIIB is selected from platinum and palladium. More preferably, the noble metal from group VIIIB is palladium.

Preferably, when the support is a refractory oxide, it is selected from the group formed by oxides of magnesium, aluminium, silicon, zirconium, thorium, titanium and/or their mixtures.

The catalyst of the invention may be obtained by the following preparation process which constitutes a further aspect of the invention. The process for producing the catalyst comprises the following steps:

1) preparing an aqueous solution of a precursor of a metallic oxide of a metal from group IB or IIB, said precursor being in the ionic form;

2) incorporating said solution obtained in the preceding step onto a support selected from the group formed by refractory oxides, coal, clays, silica-alumina and/or their mixtures;
3) drying and calcining the promoted support obtained in the preceding step;
4) preparing an aqueous solution of a precursor of the noble metal from group VIIIB;
5) incorporating said solution of a precursor of the noble metal from group VIIIB into the promoted, dried and calcined support;
6) drying, calcining the support obtained in the preceding step;
7) reducing the catalyst obtained in step 6).

The precursor of the metallic oxide of the metal from group IB or IIB is in the ionic form. The metallic element of this precursor has an oxidation number of 2 and is associated with a counter-ion selected from the group formed by acetates, hydroxides, nitrates, sulphates, acetylacetonates, oxalates and carbonates.

Preferably, the precursor of the metallic oxide of the metal from group IB or IIB is selected from zinc acetate, zinc acetylacetonate, zinc hydroxide, zinc nitrate, zinc oxalate, zinc sulphate, copper acetate, copper acetylacetonate, copper carbonate, copper hydroxide, copper nitrate, copper sulphate, cadmium acetate, cadmium acetylacetonate, cadmium carbonate, cadmium hydroxide, cadmium nitrate and cadmium sulphate.

Preferably, the metallic oxide is copper oxide and the copper oxide precursor is selected from the group formed by copper acetate, copper acetylacetonate, copper carbonate, copper hydroxide, copper nitrate and copper sulphate. Highly preferably, the copper oxide precursor is copper nitrate.

Preferably, the metallic oxide is zinc oxide and the zinc oxide precursor is selected from the group formed by zinc acetate, zinc acetylacetonate, zinc hydroxide, zinc nitrate, zinc oxalate and zinc sulphate. Highly preferably, the zinc oxide precursor is zinc nitrate.

The concentration of the aqueous solution of metallic oxide precursor is adjusted as a function of the desired quantity by weight of metallic oxide on the final catalyst. The quantity by weight of oxide of the metal from group IB or IIB with respect to the total final supported catalyst weight is in the range 2% to 50% by weight, preferably in the range 2.1% to 40% by weight, highly preferably in the range 2.5% to 30% by weight.

Incorporating the solution of metallic oxide precursor onto the support may be carried out using any technique that is known to the skilled person. Preferably, said incorporation is carried out by dry impregnation. The metallic oxide precursor solution may be impregnated in one or more successive impregnation steps.

The support is selected from the group formed by refractory oxides, coal, clays, silica-alumina and/or their mixtures. The term "refractory oxide" as used in the present invention means an oxide which has good wear resistance, heat resistance and crush strength properties. The refractory oxide may be selected from the group formed by magnesium, aluminium, silicon, zirconium, thorium or titanium oxides, used alone or as a mixture or with other oxides from the periodic classification of the elements. Preferably, the support is an aluminium oxide (alumina) or silica. Preferably, the support has a BET surface area in the range 110 to 300 m²/g, more advantageously in the range 110 to 250 m²/g. The pore volume of the support is in the range 0.1 to 1.5 cm³/g. The BET specific surface area is measured by nitrogen physisorption. The total pore volume is measured by mercury porosimetry in accordance with ASTM standard D4284-92 with a wetting angle of 140°, for example using a Micromeritics instrument, model Autopore III.

The support may be in the form of beads, extrudates, trilobes, pellets, or irregular and non-spherical agglomerates the specific shape of which may result from a crushing step, or it may be monolithic. Advantageously, said support is in the form of beads or extrudates.

The promoted support is dried in order to eliminate all or a portion of the water introduced during impregnation, preferably at a temperature in the range 50° C. to 250° C., more preferably in the range 70° C. to 200° C. Drying is carried out in air or in an inert atmosphere (for example nitrogen).

The promoted support is then calcined in a stream of gas, preferably in air. The calcining temperature is generally in the range 150° C. to 450° C., preferably in the range approximately 200° C. to approximately 400° C. The calcining period is generally in the range 0.5 hours to 24 hours, more preferably in the range 1 hour to 12 hours. The calcining step may be carried out using ramp-up temperature stages up to the desired temperature.

The precursor of a noble metal from group VIIIB is in the form of a salt and is selected from the group constituted by palladium nitrate, palladium sulphate, palladium acetate, palladium acetylacetonate, platinum nitrate, platinum sulphate, platinum acetate and platinum acetylacetonate. Preferably, when the metal from group VIIIB is palladium, the palladium precursor salt is palladium nitrate. The concentration of the aqueous solution of the palladium precursor is adjusted as a function of the desired quantity by weight of palladium on the final supported catalyst. Said precursor of a noble metal from group VIIIB may be dissolved in an aqueous solution in the presence or absence of a mineral base. Thus, in a variation of the process of the invention, the solution of the precursor of the noble metal from group VIIIB may be neutralized by a mineral base selected from the group formed by alkali hydroxides and alkaline-earth hydroxides. In this variation a colloidal suspension of particles of an oxide of a noble metal from group VIIIB can be formed. Preferably, the mineral base is sodium hydroxide.

Irrespective of the variation of the process, the quantity by weight of palladium with respect to the total weight of the final supported catalyst is in the range 0.01% to 2% by weight, preferably in the range 0.05% to 1% by weight.

The aqueous solution of the precursor of a noble metal from group VIIIB is incorporated into the promoted support using any technique which is known to the skilled person. Preferably, incorporation is carried out by dry impregnation. The solution of the precursor of a noble metal from group VIIIB is impregnated in one or more successive impregnation steps.

The support doubly impregnated with a precursor of a metallic oxide from group IB or IIB and a precursor of a noble metal from group VIIIB is dried in order to eliminate all of a portion of the water introduced during impregnation, preferably at a temperature in the range 50° C. to 250° C., more preferably in the range 70° C. to 200° C. Drying is carried out in air, or in an inert atmosphere (for example nitrogen).

Next, the doubly promoted and dried support is calcined in a stream of gas, preferably in air, in hydrogen, in nitrogen or in a mixture of at least two of these gases in order to obtain a catalyst. The calcining temperature is generally in the range 150° C. to 450° C., preferably in the range approximately 200° C. to approximately 400° C. The calcining period is generally in the range 0.5 hours to 24 hours, preferably 1 hour to 12 hours. The calcining step may be operated in temperature stages, up to a maximum defined set temperature.

The catalyst is then reduced under mild conditions. This step is preferably carried out in the presence of an in situ reduction gas, i.e. in the reactor in which the catalytic transformation is being carried out, comprising in the range 25% by volume to 100% by volume of hydrogen, preferably 100% by volume of hydrogen. Preferably, this step is carried out at a temperature in the range 50° C. to 300° C., more preferably in the range 80° C. to 160° C. This step means that the oxide of the noble metal from group VIIIB can be selectively reduced to its metallic form, leaving the oxide of the metal from group IB or IIB quasi-intact. Thus, a catalyst is obtained with an active phase which is a mixture of a noble metal from group VIIIB and a metallic oxide from group IB or IIB.

The process of the invention can be used to obtain a catalyst the active phase of which is constituted by two metals which are in distinct metallic forms. The noble metal from group VIIIB is in the reduced form and the metal from group IB or IIB is in its oxide form. These two forms co-exist in the pore volume of the support. The successive steps of impregnating the precursor of the noble metal from group VIIIB and the precursor of the metallic oxide from group IB or IIB followed by drying and calcining mean that the formation of an alloy of the VIIIB metal with the metallic oxide of the metal from group IB or IIB can be avoided. The Applicant has discovered that the affinity for sulphur-containing impurities is higher for the oxide of the metal from group IB or IIB than for the noble metal from group VIIIB in its reduced form. The oxide of the metal from group IB or IIB adsorbs these sulphur-containing impurities and prevents poisoning of the active sites for hydrogenation. These sites are formed by the metal from group VIIIB in its reduced form. Surprisingly, adding at least one oxide of the metal from group IB or IIB improves the selectivity of the catalyst.

The invention also concerns the catalyst obtained from the preparation process described above.

Another aspect of the invention concerns the use of the catalyst of the invention or of the catalyst obtained by the process described above in a reaction for the transformation of organic compounds. Thus, the catalyst of the invention or the catalyst obtained using the process of the invention may be used in reactions that involve cleaving or forming carbon-carbon bonds. The catalyst of the invention or the catalyst obtained using the process of the invention can be used for the selective hydrogenation of compounds comprising at least one acetylenic, dienic and/or alkenylaromatic function.

The operating conditions used for these reactions are as follows: a temperature in the range 0° C. to 500° C., preferably in the range 25° C. to 350° C., a pressure in the range 0.1 to 20 MPa, preferably in the range 0.1 to 10 MPa, an hourly space velocity (HSV) in the range 0.1 to 50 $h^{-1}$, preferably in the range 0.5 to 30 $h^{-1}$ for a liquid feed; and in the range 500 to 30000 $h^{-1}$, preferably in the range 500 to 15000 $h^{-1}$ for a gas feed. When hydrogen is present, the volume ratio of hydrogen to the feed is in the range 1 to 500 liters per liter, preferably in the range 10 to 250 liters per liter.

The catalyst of the invention or the catalyst prepared in accordance with the process of the invention and the conditions for its use can be adapted by the user to the reaction and the technology employed. In general, it is used by injecting hydrocarbon feed to be treated and hydrogen into at least one reactor containing said catalyst, the reactor being in a fixed bed, moving bed or ebullated bed, preferably into a fixed bed reactor. The whole of said feed is preferably injected to the inlet of the reactor where the selective hydrogenation reaction takes place. However, it may be advantageous in some cases to inject a fraction or all of said feed between two consecutive catalytic beds placed in said reactor. This implementation can in particular mean that the reactor can be kept operational even when the inlet to said reactor is blocked by deposits of polymers, particles or gums present in said feed.

The selective hydrogenation process comprises bringing a hydrocarbon feed comprising at least one polyunsaturated compound into contact with the catalyst of the invention or the catalyst obtained using the process described above.

Said hydrocarbon feed comprises at least one polyunsaturated compound and sulphur-containing impurities. Preferably, said hydrocarbon feed is a pyrolysis gasoline. The pyrolysis gasoline corresponds to a cut with a boiling point that is generally in the range 0° C. to 250° C., preferably in the range 10° C. to 220° C. This feed generally comprises the C5-C12 cut with traces of C3, C4, C13, C14, C15 compounds (for example in the range 0.1% to 3% by weight for each of these cuts). As an example, a feed formed by pyrolysis gasoline generally has the following composition by weight: 8% to 12% by weight of paraffins, 58% to 62% by weight of aromatic compounds, 8% to 10% by weight of mono-olefins, 18% to 22% by weight of diolefins and 20 to 300 ppm (parts per million) by weight of sulphur, the sum of these compounds making 100%.

The sulphur-containing impurities may be sulphur-containing compounds such as $H_2S$, COS, mercaptans or thiophenic compounds which deactivate the selective hydrogenation catalysts.

In the case of selective hydrogenation of a pyrolysis gasoline, the (hydrogen)/(polyunsaturated compounds to be hydrogenated) molar ratio is generally in the range 1 to 2, the temperature is generally in the range 40° C. to 200° C., preferably in the range 50° C. to 180° C., the HSV is generally in the range 0.5 $h^{-1}$ to 50 $h^{-1}$, preferably in the range 1 $h^{-1}$ to 30 $h^{-1}$ and the pressure is generally in the range 1.0 MPa to 6.5 MPa, preferably in the range 2.0 MPa to 3.5 MPa. The flow rate of the hydrogen is adjusted in order to supply it in sufficient quantity to theoretically hydrogenate all of the polyunsaturated compounds and to maintain an excess of hydrogen at the reactor outlet. In order to limit the temperature gradient in the reactor, it may be advantageous to recycle a fraction of the effluent to the inlet and/or to the mid-part of the reactor.

The invention is illustrated by the following examples which are not limiting in any way.

EXAMPLES

In the examples below, the specific surface area of the support was measured using the BET method (ASTM standard D3663). The pore volume was measured by mercury porosimetry in accordance with the ASTM standard D4284-92 with a wetting angle of 140°.

Example 1

Catalyst A (Not in Accordance with the Invention)

An aqueous solution of palladium nitrate $Pd(NO_3)_2$ was prepared by diluting 6.51 g of an aqueous solution of palladium nitrate $Pd(NO_3)_2$ containing 10% by weight of palladium nitrate and 10% by weight of nitric acid (Aldrich) with demineralized water. The total volume of the prepared aqueous solution corresponded to the pore volume of the support.

This solution was then impregnated onto 100.02 g of an alumina with a specific surface area of 200 m²/g and a pore volume of 0.52 ml/g. This alumina was in the form of extrudates with a mean diameter of 1.2 mm.

Catalyst A obtained was dried in air at 120° C., and then was calcined for 2 hours at 350° C. in a stream of air with a flow rate of 1 l·h⁻¹(g of catalyst)⁻¹.

Catalyst A contained 0.3% by weight of Pd with respect to the total catalyst weight.

Example 2

Catalyst B (Not in Accordance with the Invention)

An aqueous solution of copper nitrate $Cu(NO_3)_2$ was prepared by diluting 3.75 g of hydrated copper nitrate (Aldrich) and 5 mL of a $1 \times 10^{-3}$ mole/L nitric acid solution with demineralized water. The total volume of the prepared aqueous solution corresponded to the pore volume of the support.

This solution was then impregnated onto 97.30 g of an alumina with a specific surface area of 200 m²/g and a pore volume of 0.52 ml/g. This alumina was in the form of extrudates with a mean diameter of 1.2 mm.

The promoted support obtained was dried in air at 120° C. then was calcined for 2 hours at 350° C. in a stream of air with a flow rate of 1 l·h⁻¹(g of catalyst)⁻¹.

An aqueous solution of palladium nitrate $Pd(NO_3)_2$ was prepared by diluting 6.50 g of an aqueous solution of palladium nitrate $Pd(NO_3)_2$ containing 10% by weight of palladium nitrate and 10% by weight of nitric acid (Aldrich) with demineralized water. The total volume of the prepared aqueous solution corresponded to the pore volume of the promoted support.

This solution was then impregnated onto the prepared promoted alumina support.

Catalyst B obtained was dried in air at 120° C. then was calcined for 2 hours at 350° C. in a stream of air with a flow rate of 1 l·h⁻¹(g of catalyst)⁻¹. Catalyst B contained 0.3% by weight of Pd and 1.33% by weight of CuO with respect to the total catalyst weight.

Example 3

Catalyst C (In Accordance with the Invention)

An aqueous solution of zinc nitrate $Zn(NO_3)_2$ was prepared by diluting 8.92 g of hexahydrated zinc nitrate (Aldrich) and 5 mL of a $1 \times 10^{-4}$ mole/L nitric acid solution with demineralized water. The total volume of the prepared aqueous solution corresponded to the pore volume of the support.

This solution was then impregnated onto 97.25 g of an alumina with a specific surface area of 200 m²/g and a pore volume of 0.52 ml/g. This alumina was in the form of extrudates with a mean diameter of 1.2 mm.

The promoted support obtained was dried in air at 120° C. then was calcined for 2 hours at 350° C. in a stream of air with a flow rate of 1 l·h⁻¹(g of catalyst)⁻¹.

An aqueous solution of palladium nitrate $Pd(NO_3)_2$ was prepared by diluting 6.52 g of an aqueous solution of palladium nitrate $Pd(NO_3)_2$ containing 10% by weight of palladium nitrate and 10% by weight of nitric acid (Aldrich) with demineralized water. The total volume of the prepared aqueous solution corresponded to the pore volume of the promoted support.

This solution was then impregnated onto the prepared promoted alumina support.

Catalyst C obtained was dried in air at 120° C. then was calcined for 2 hours at 350° C. in a stream of air with a flow rate of 1 l·h⁻¹(g of catalyst)⁻¹. Catalyst C contained 0.3% by weight of Pd and 2.6% by weight of ZnO with respect to the total catalyst weight.

Example 4

Catalyst D (In Accordance with the Invention)

An aqueous solution of zinc nitrate $Zn(NO_3)_2$ was prepared by diluting 39.20 g of hexahydrated zinc nitrate (Aldrich) and 5 mL of a $1 \times 10^{-4}$ mole/L nitric acid solution with demineralized water. The total volume of the prepared aqueous solution corresponded to the pore volume of the support.

This solution was then impregnated onto 78.19 g of an alumina with a specific surface area of 200 m²/g and a pore volume of 0.52 ml/g. This alumina was in the form of extrudates with a mean diameter of 1.2 mm.

The promoted support obtained was dried in air at 120° C. then was calcined for 2 hours at 350° C. in a stream of air with a flow rate of 1 l·h⁻¹(g of catalyst)⁻¹.

The first impregnation was repeated in the same manner, this time with 36.94 g of hexahydrated zinc nitrate.

An aqueous solution of palladium nitrate $Pd(NO_3)_2$ was prepared by diluting 6.50 g of an aqueous solution of palladium nitrate $Pd(NO_3)_2$ containing 10% by weight of palladium nitrate and 10% by weight of nitric acid (Aldrich) with demineralized water. The total volume of the prepared aqueous solution corresponded to the pore volume of the promoted support.

This solution was then impregnated onto the prepared promoted alumina support.

Catalyst D obtained was dried in air at 120° C. then was calcined for 2 hours at 350° C. in a stream of air with a flow rate of 1 l·h⁻¹(g of catalyst)⁻¹. Catalyst D contained 0.3% by weight of Pd and 20.85% by weight of ZnO with respect to the total catalyst weight.

Example 5

Catalyst E (In Accordance with the Invention)

An aqueous solution of copper nitrate $Cu(NO_3)_2$ was prepared by diluting 30.70 g of hydrated copper nitrate (Aldrich) and 5 mL of a $1 \times 10^{-3}$ mole/L nitric acid solution with demineralized water. The total volume of the prepared aqueous solution corresponded to the pore volume of the support.

This solution was then impregnated onto 88.93 g of an alumina with a specific surface area of 200 m²/g and a pore volume of 0.52 ml/g. This alumina was in the form of extrudates with a mean diameter of 1.2 mm.

The promoted support obtained was dried in air at 120° C. then was calcined for 2 hours at 350° C. in a stream of air with a flow rate of 1 l·h⁻¹(g of catalyst)⁻¹.

An aqueous solution of palladium nitrate $Pd(NO_3)_2$ was prepared by diluting 6.51 g of an aqueous solution of palladium nitrate $Pd(NO_3)_2$ containing 10% by weight of palladium nitrate and 10% by weight of nitric acid (Aldrich)

with demineralized water. The total volume of the prepared aqueous solution corresponded to the pore volume of the promoted support.

This solution was then impregnated onto the prepared promoted alumina support.

Catalyst E obtained was dried in air at 120° C. then was calcined for 2 hours at 350° C. in a stream of air with a flow rate of 1 l·h$^{-1}$(g of catalyst)$^{-1}$. Catalyst E contained 0.3% by weight of Pd and 10.75% by weight of CuO with respect to the total catalyst weight.

Example 6

Catalytic Hydrogenation Test on a Styrene-Isoprene Mixture in the Presence of Sulphur-Containing Compounds Before the catalytic test, catalysts A, B, C, D and E were treated in a stream of one liter of hydrogen per hour per gram of catalyst with a temperature ramp-up of 300° C./h and a constant temperature stage of 150° C. for 2 hours in order to reduce exclusively palladium to the metallic form. Thus, catalysts B, C, D and E were obtained, promoted by palladium in the metallic form and zinc oxide or copper oxide.

The catalysts then underwent a hydrogenation test in a continuously stirred "Grignard" type batch reactor. To this end, 4 mL of reduced catalyst was placed, without exposure to air, in an annular basket located around the stirrer. The baskets used in the reactors were of the Robinson Mahonnay type.

Hydrogenation was carried out in the liquid phase.

The composition of the feed was as follows: 8% by weight styrene, 8% by weight isoprene, 262 ppm thiophene and three different quantities of pentanethiol, with the qs to 100% by weight being solvent, namely n-heptane. The quantities of pentanethiol tested were 16 ppm, 32 ppm and 96 ppm (ppm: parts per million; qs: quantity sufficient to).

The test was carried out at a constant pressure of 3.5 MPa of hydrogen and at a temperature of 45° C. The reaction products were analyzed by gas chromatography.

The catalytic activities were expressed in moles of H$_2$ consumed per minute per gram of palladium.

The selectivities for the formation of olefin were also measured using the following equation:

Selectivity=% C5 olefins/(% C5 olefins+% C5 paraffins)×100.

The selectivity was measured at high activity, i.e. when 99.8% of the isoprene had been converted and for a feed with a pentanethiol content of 32 ppm. The results are presented in Table 1.

TABLE 1

Activities and selectivities measured for hydrogenation of a styrene-isoprene mixture in the presence of sulphur-containing compounds

| Catalysts | Catalytic activity (moles H$_2$ per minute per gram of Pd) | | | Olefin formation selectivity at 99.8% conversion of isoprene (%) |
|---|---|---|---|---|
| | 16 ppm Pentanethiol | 32 ppm Pentanethiol | 96 ppm Pentanethiol | 32 ppm pentanethiol |
| Catalyst A (not in accordance) | 1.30 | 0.98 | 0.06 | 90.1 |

TABLE 1-continued

Activities and selectivities measured for hydrogenation of a styrene-isoprene mixture in the presence of sulphur-containing compounds

| Catalysts | Catalytic activity (moles H$_2$ per minute per gram of Pd) | | | Olefin formation selectivity at 99.8% conversion of isoprene (%) |
|---|---|---|---|---|
| | 16 ppm Pentanethiol | 32 ppm Pentanethiol | 96 ppm Pentanethiol | 32 ppm pentanethiol |
| Catalyst B (not in accordance) | 0.42 | 0.04 | 0.03 | N.D.* |
| Catalyst C | 2.10 | 1.44 | 0.52 | 97.7 |
| Catalyst D | 2.29 | 1.43 | 0.61 | 98.7 |
| Catalyst E | 4.49 | 2.94 | 1.30 | 92.6 |

*N.D: Not measurable as the activity of catalyst B was too low to reach 99.8% isoprene conversion.

Catalysts C, D and E in accordance with the invention were more active and the deactivation was less pronounced when the quantity of sulphur-containing compound increased in the reaction media compared with catalysts A and B, not in accordance with the invention. Catalysts A and B were deactivated by of the order of 95% when the quantity of pentanethiol was 96 ppm with respect to a content of 16 ppm, while catalysts C, D and E were respectively 75%, 73% and 71% deactivated when the feed comprised 96 ppm pentanethiol instead of 16 ppm.

The selectivities for the formation of olefins for the catalysts of the invention were higher by 1.5% to 8.6% compared with catalyst A, not in accordance, for an isoprene conversion of 99.8%.

The invention claimed is:

1. A thioresistant catalyst comprising an active phase deposited on a support,
    said active phase consisting of at least one noble metal from group VIIIB in the reduced form, which is selected from the group consisting of platinum and palladium and at least 2% to 50% by weight of a metallic oxide from group IB or from group IIB with respect to the total catalyst weight, said metallic oxide being selected from the group consisting of copper oxide, zinc oxide and cadmium oxide,
    said support being selected from the group consisting of refractory oxides, coal, clays, silica-alumina and their mixtures, and
    said support having a specific surface area of 110 to 300 m$^2$/g.

2. The catalyst according to claim 1, in which the quantity by weight of metallic oxide from group IB or IIB with respect to the total mass of the final supported catalyst is 2.1% to 45% by weight.

3. The catalyst according to claim 1, in which the metallic oxide from group IB or IIB is copper oxide.

4. The catalyst according to claim 1, in which the quantity by weight of noble metal from group VIM with respect to the total mass of the final supported catalyst is 0.01% to 2% by weight.

5. The catalyst according to claim 1, in which the noble metal from group VIIIB is palladium.

6. The catalyst according to claim 1, in which the refractory oxide is selected from the group consisting of oxides of magnesium, aluminum, silicon, zirconium, thorium, titanium and their mixtures.

7. The catalyst according to claim 1, in which the quantity by weight of metallic oxide from group IB or IIB with respect to the total mass of the final supported catalyst is 2.5% to 30% by weight.

8. The catalyst according to claim 1, in which the quantity by weight of noble metal from group VIIIB with respect to the total mass of the final supported catalyst is 0.05% to 1% by weight.

9. A process for preparing a thioresistant catalyst according to claim 1, comprising
   1) preparing an aqueous solution of a precursor of an oxide of a metal from group IB or IIB, said metallic oxide being selected from the group consisting of copper oxide, zinc oxide and cadmium oxide, said precursor being in the ionic form;
   2) incorporating said solution obtained in the preceding step onto a support selected from the group consisting of refractory oxides, coal, clays, silica-alumina and their mixtures;
   3) drying and calcining the promoted support obtained in the preceding step;
   4) preparing an aqueous solution of a precursor of the noble metal from group VIIIB, which is selected from the group consisting of platinum and palladium;
   5) incorporating said solution of a precursor of the noble metal from group VIIIB into the promoted, dried and calcined support;
   6) drying, calcining the support obtained in the preceding step; and
   7) reducing the catalyst obtained in step 6).

10. The process according to claim 9, in which the precursor of the oxide of the metal from group IB or IIB is selected from the group consisting of zinc acetate, zinc acetylacetonate, zinc hydroxide, zinc nitrate, zinc oxalate, zinc sulphate, copper acetate, copper acetylacetonate, copper carbonate, copper hydroxide, copper nitrate, copper sulphate, cadmium acetate, cadmium acetylacetonate, cadmium carbonate, cadmium hydroxide, cadmium nitrate and cadmium sulphate.

11. The process according to claim 9, in which the precursor of a noble metal from group VIIIB is a salt selected from the group consisting of palladium nitrate, palladium sulphate, palladium acetate, palladium acetylacetonate, platinum nitrate, platinum sulphate, platinum acetate and platinum acetylacetonate.

12. The process according to claim 9, in which the aqueous solution of said precursor of a noble metal from group VIIIB is neutralized by a mineral base selected from the group consisting of alkali hydroxides and alkaline-earth hydroxides.

13. The process according to claim 9, in which the reduction step is carried out in situ in the presence of a reducing gas and at a temperature of 50° C. to 300° C.

14. A process for preparing a thioresistant catalyst according to claim 1, comprising
   1) preparing an aqueous solution of a precursor of an oxide of a metal from group IB or IIB, said metallic oxide being selected from the group consisting of copper oxide, zinc oxide and cadmium oxide, said precursor being in the ionic form;
   2) incorporating said solution obtained in the preceding step onto a support selected from the group consisting of refractory oxides, coal, clays, silica-alumina and their mixtures;
   3) drying and calcining the promoted support obtained in the preceding step;
   4) preparing an aqueous solution of a precursor of the noble metal from group VIM, which is selected from the group consisting of platinum and palladium;
   5) incorporating said solution of a precursor of the noble metal from group VMS into the promoted, dried and calcined support;
   6) drying, calcining the support obtained in the preceding step; and
   7) reducing the catalyst obtained in step 6) in situ in the presence of a reducing gas and at a temperature of 80° C. to 160° C.

15. A method for the transformation of organic compounds, comprising catalyzing a reaction of said organic compounds by a catalyst according to claim 1.

16. The method according to claim 15, which is for selectively hydrogenating compounds comprising at least one acetylenic, dienic and/or alkenylaromatic function.

* * * * *